(12) United States Patent
DeMaio et al.

(10) Patent No.: US 7,600,194 B2
(45) Date of Patent: Oct. 6, 2009

(54) START MENU OPERATION FOR COMPUTER USER INTERFACE

(75) Inventors: Pasquale DeMaio, Bellevue, WA (US); Matthew R. Lerner, Seattle, WA (US); Charles Cummins, Seattle, WA (US); Song Zou, Issaquah, WA (US); Bret P. Anderson, Kirkland, WA (US); David A. Matthews, Seattle, WA (US); Isabelo Valentin de los Reyes, Bellevue, WA (US); Joseph H. Matthews, III, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 15 days.

(21) Appl. No.: 11/292,794

(22) Filed: Dec. 2, 2005

(65) Prior Publication Data
US 2007/0130535 A1    Jun. 7, 2007

(51) Int. Cl.
*G06F 3/00* (2006.01)
(52) U.S. Cl. ............... 715/810; 715/863; 715/865; 715/825
(58) Field of Classification Search .......... 715/810, 715/825, 863, 865
See application file for complete search history.

(56) References Cited

U.S. PATENT DOCUMENTS

| | | | |
|---|---|---|---|
| 5,877,765 A | 3/1999 | Dickman | 345/349 |
| 6,181,344 B1 | 1/2001 | Tarpenning | 345/358 |
| 6,643,721 B1 * | 11/2003 | Sun | 710/62 |
| 6,819,340 B2 | 11/2004 | Burke | 345/738 |
| 6,897,833 B1 | 5/2005 | Robinson | 345/173 |
| 6,940,488 B1 | 9/2005 | Siddiqui | 345/163 |
| 7,055,110 B2 * | 5/2006 | Kupka | 715/863 |
| 2002/0186254 A1 | 12/2002 | Monbaron | |
| 2003/0038825 A1 | 2/2003 | Wen et al. | |

(Continued)

FOREIGN PATENT DOCUMENTS

GB    2355145    11/2001

(Continued)

OTHER PUBLICATIONS

Customize My MAC; Optimize My Keyboard, Mouse, and Trackpad, http://www.apple.com/support/mac101/customize/4/, Jun. 5, 2005.

(Continued)

*Primary Examiner*—Sy D Luu
(74) *Attorney, Agent, or Firm*—Workman Nydegger (57) ABSTRACT

Described is distinguishing between input mechanisms to determine which input mechanism was used to activate a start menu. A start menu is selected that corresponds to the input mechanism that was used to activate it. Further data corresponding to start menu interaction is received, and action is taken via based on the further interaction. For example, upon detecting activation of a start menu, how the start menu was activated from among activation types is used to present a first start menu/behavior for a first activation type, which may differ from a second start menu/behavior activated via a second activation type. For example, a determination may be made as to whether a start menu was invoked via a pointing device or via keyboard; when via keyboard, a search entry region may be provided, by which a user may directly enter search criteria via the keyboard.

18 Claims, 6 Drawing Sheets

U.S. PATENT DOCUMENTS

| | | |
|---|---|---|
| 2005/0088414 A1 | 4/2005 | Adan et al. |
| 2005/0120312 A1 | 4/2005 | Nguyen |
| 2005/0099395 A1 | 5/2005 | Marsden et al. |
| 2005/0151725 A1 | 7/2005 | Jennings |

FOREIGN PATENT DOCUMENTS

| | | |
|---|---|---|
| WO | WO02065674 | 8/2002 |

OTHER PUBLICATIONS

4.,, MMS Graphical User Interface; http://wwwbrr.cr.usgs.gov/projects/SW_precip_runoff/mms/html/chap3,frame.new.htm, Mar. 1998.

* cited by examiner

START MENU OPERATION FOR COMPUTER USER INTERFACE

BACKGROUND

The Start button on contemporary (e.g., Microsoft Windows®-based) computer shells/user interfaces provides a simple and unambiguous way for even novice users to activate a Start menu, e.g., via a mouse point-and-click operation. Some contemporary keyboards include one or more dedicated keys, e.g., marked with a Microsoft Windows® logo, that when pressed provide the same Start menu.

In general, from the Start menu, various computer programs and tasks may be launched. However, for many users, the Start menu only provides basic functionality, and may not even be used very often, as shortcuts and the like appearing on the shell program's desktop can also launch application programs and tasks.

Moreover, the computing model around which the Start button was designed has changed. For example, in the past, typical users had on the order of ten programs and a few hundred documents, with most if not all located on one or more local hard drives. Today, with types of documents including conventional documents, mail messages, photos, songs and movies being digitized, users may have thousands or even millions of documents. These documents may be scattered among various sources, e.g., on local drives, on the internet, on home and/or enterprise networks, and/or other places such as USB storage devices.

SUMMARY

This Summary is provided to introduce a selection of concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the present invention are directed towards a new user experience when activating and interfacing with the Start menu. Upon detecting activation of the start menu, a determination is made as to how the start menu was activated from among a plurality of possible activation types. When the start menu was activated a first way, the start menu is provided based upon a first behavior. When the start menu was activated a second way, the start menu is provided based upon a second behavior.

By distinguishing between a plurality of input mechanisms to determine which input mechanism was used to activate a start menu, a start menu may be selected to correspond to the input mechanism that was used. After outputting the selected start menu, data corresponding to interaction with the start menu is received. Action is taken based on the further interaction.

For example, the Start menu may automatically sense the user's likely intent and provide an edit field in which the user may enter text corresponding to search criteria; when documents are to be searched, such a field will help make computing from the Start menu more document-centric rather than program-centric. Another example is to automatically and/or intelligently provide a "Run . . . " dialog or the like, provide a command prompt dialog, run a batch operation (e.g., run a media program if started via remote control), run a certain profile, and so forth. Still other automated/intelligent start menu options are also feasible.

Moreover, the Start menu can appear and/or behave differently depending on how the user activates it. For example, mouse interaction to activate the Start menu may provide one behavior (such as today's conventional operation), while keyboard activation may provide another behavior, such as to prepare the edit field directed towards searching, and move an input cursor into the field to facilitate immediate typing, e.g., automatically or upon the user typing a subsequent alphanumeric character. In this example, the on-screen Start button and corresponding Start menu behavior is optimized for mouse navigation, while search is optimized for keyboard interaction. The Start menu may look very different (or actually be different Start menus) depending on the activation mechanism used to invoke it. However, the concept remains the same, that is, a well-understood entry point (the Start menu) is maintained for user interaction.

Other Start Menu activation mechanisms, which may also provide different behaviors, include touch and pen on appropriate surfaces (e.g., touch/pen sensitive screens), remote control button and speech. Each of these may have different sub-behaviors, e.g., a pen may have different Start menu behaviors depending on whether the Start menu is being invoked via a tap or via a gesture. Different speech (e.g., commands) may be distinguished to provide different behavior, e.g., a "Start" command may provide one Start menu/behavior, while a "Start Search" command may provide another Start menu/behavior.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
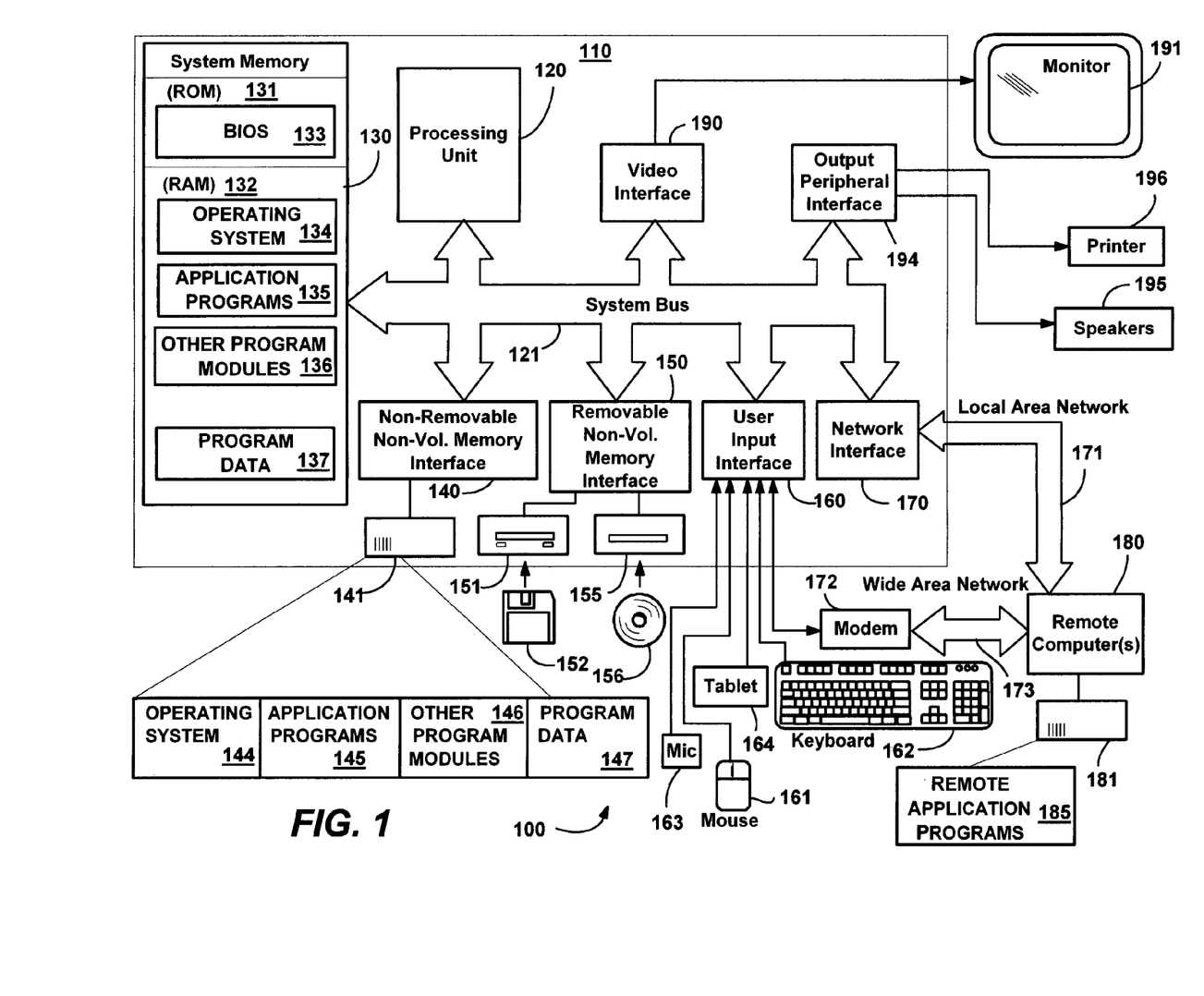
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Hybrid Object Placement for Parallel Repair and Load Balancing

Various aspects of the technology described herein are directed towards changing the behavior and/or appearance of a Start menu in a computer system user interface/shell. In general, one aspect is directed to Start menu behavior that facilitates searching. Another aspect is directed towards differentiating behavior and/or appearance based on the mechanism that was used to activate the Start menu. However, as will be understood, the present invention is not limited to the examples used herein, but may also apply to other behaviors, input devices and so forth, e.g., a face recognition-capable computer may automatically start a user profile with one set of Start menu behaviors for one user, but do something entirely different from another, including requiring a more conventional input to invoke the Start menu. As such, any of the examples mentioned herein are non-limiting, and the present invention may be used various ways that provide benefits and advantages in computing in general.

Figure 2:
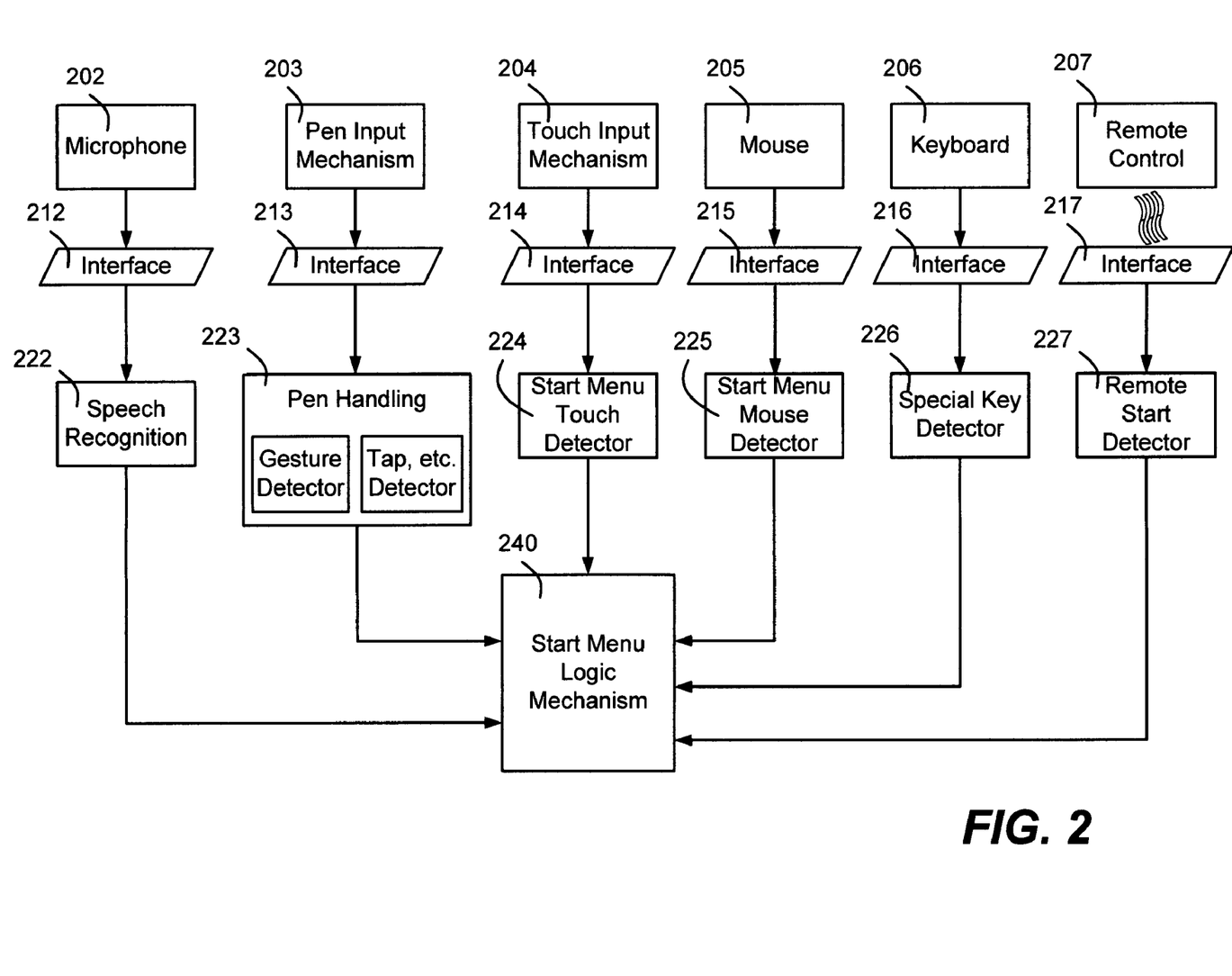
FIG. 2 is a block diagram representing an example set of input mechanisms and software input handlers, including a mechanism for determining Start menu behavior.

Turning to FIG. 2 of the drawings, there is shown a block diagram generally representing an exemplary architect 202, pen detector 203, touch detector 204, mouse 205, keyboard 206 and remote control 207. Note that some of the mechanisms correspond to those described with reference to FIG. 1, but have been distinctly labeled to emphasize that FIG. 1 is only one example type of a computer system into which the present invention may be incorporated. Thus, as can be readily appreciated, a given computer system such as that shown in FIG. 1 may not have all of the hardware input mechanisms shown, while others may have input mechanisms that are not shown, e.g., proximity sensors, cameras (e.g., for face recognition), and so forth.

As represented in FIG. 2, the input device 202-207 interface via appropriate hardware/software interfaces 212-217 to respective software blocks 222-227 that handle the input data. Although only the remote control interface 217 is represented as receiving wireless data, it is understood that any communication means between any hardware input device and its interface is feasible, including wired or wireless (e.g., Blue-Tooth, RF, infrared, and so forth). Such interfaces 212-217 and software-based input handlers 222-227 are well-known, and are not described herein for purposes of simplicity, except to note that the represented blocks need not be monolithic code modules, but rather may represent a combination of software modules and the like that are arranged to perform various functionality. For example, any exemplified block may include its primary functionality (e.g., a speech recognition engine), but also may include a module that filters and/or re-routes Start menu invoking commands to a Start menu logic mechanism 240. As another example, the pen handling block 223 is represented as including code to differentiate between gestures and other user patterns such as taps, holds, double-taps, and the like, which may be different modules from a handwriting recognition module. Note that the Start menu logic mechanism 240 may do some of its own filtering/routing, e.g., the speech recognition block may feed the text of all recognized speech to the Start menu logic mechanism, which then only acts on text related to Start-menu operation, filtering out (or re-routing elsewhere) unrelated recognized text.

Figure 3:
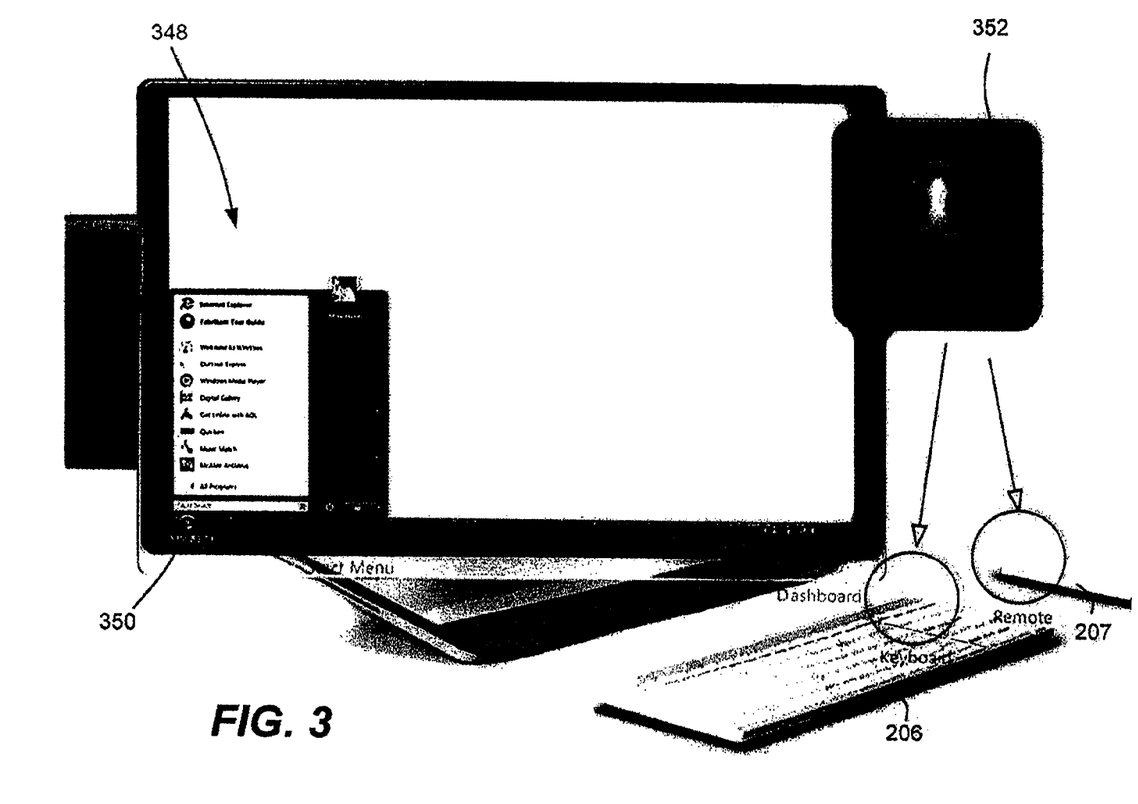
FIG. 3 is a representation of a computer system in which multiple ways to invoke a start menu are provided.
Figure 4:
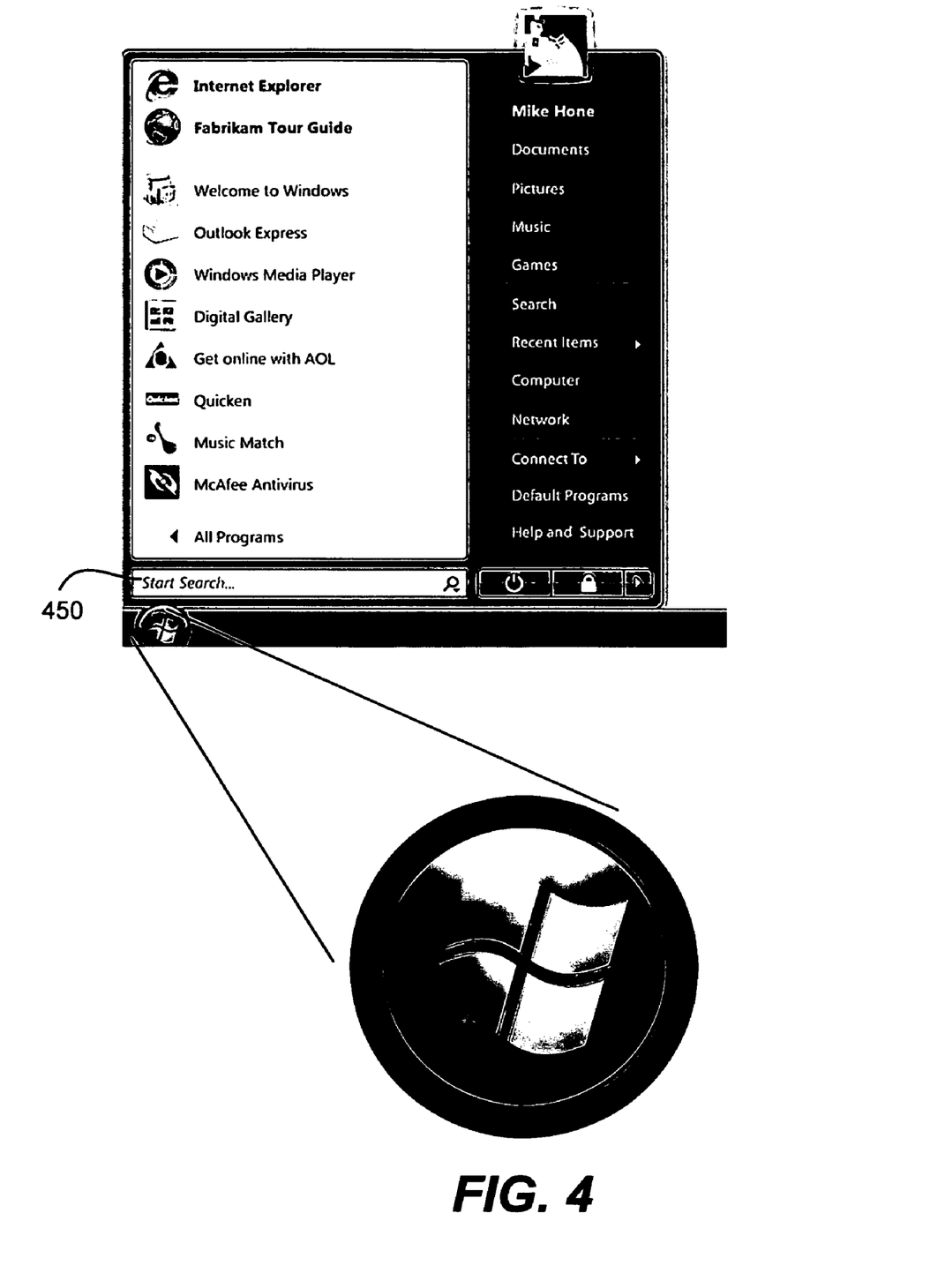
FIG. 4 is a representation of an example Start menu and start button.

FIG. 3 is a representation of an example computer system having multiple mechanisms to activate the Start menu 348. One represented is a displayed start button 350, which can be activated by a mouse (and possibly touch or pen, depending on the type of screen). Another represented mechanism comprises a physical button on a keyboard 206 or remote control device 207. Note that in FIG. 3, a magnified image 352 of such a physical button is shown as one example of a way in which the button may appear to a user. FIG. 4 shows another example, including an enlarged image, such as of the button 350 displayed on a screen, and/or possibly physically present on a monitor housing that surrounds the screen.

Figure 5:
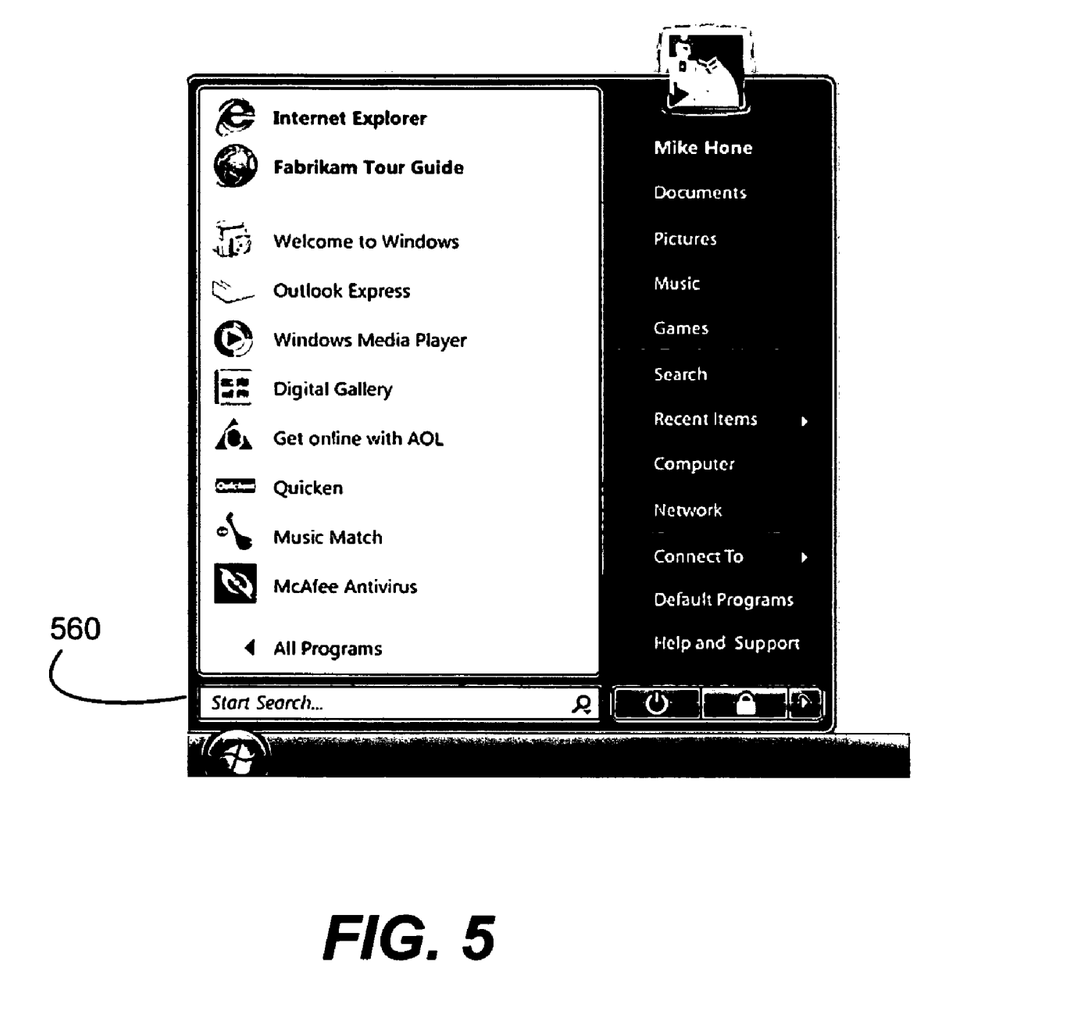
FIG. 5 is a representation of an example Start menu configured with searching behavior.

Turning to an explanation of the operation of one example of Start menu technology, in general, when invoked the Start menu does not necessarily pop-up and await selection of a choice, but may instead automatically provide a selection and/or facilitate further input. As one example, FIG. 5 shows an edit field that automatically appears when the user selects the Start menu (or types on any appropriate key, e.g., an alphanumeric key, following Start menu selection, possibly within a time window). Note that the search field may expand to display results, or the results may be displayed in another location, including partial results as the users enters text. Results may be navigated and selected such as by scroll bars and cursor keys. As can be readily appreciated, other options may automatically result instead of a search option, (such as the "Run . . . " dialog appearing, or a power event being generated), and any Start menu behavior may be user-configurable. As another example, instead of a single search option, a more complex set of search options may be enabled, such as to provide for highlighted or other selection among different types of searches, scopes and/or places to search.

Another aspect is directed towards changing the Start menu behavior and/or appearance based on the input mechanism that was used to invoke the Start menu. For example, if a user used a dedicated keyboard key (or key combination, e.g., ALT-CTL-F10) to invoke the Start menu, then the edit field 560 of FIG. 5 may automatically appear, but not if the user used the mouse to invoke the Start menu. This facilitates inputting text for searching when the user is already using the keyboard, or inputting further mouse input to select an action (which may include search) when the user has invoked the Start menu via the mouse.

Still further, the presence, appearance and/or order of the items on the Start menu may vary depending on which input device invoked the Start menu. Moreover, different ways of using the same input mechanism may provide different Start menu behavior/appearance; secondary functionality may depend on the type of actuation. Thus, for example, a left dedicated Start key may search for application programs, while a right dedicated Start key may search for documents. Single versus double presses of the key and so forth (e.g., hold for a threshold duration) may automatically determine where to search, e.g., locally, or remotely (LAN or WAN). If the user used a pen tap on a pen-sensitive device to invoke the Start menu, a pop-up soft keyboard may appear in conjunction with an edit field for entering search criteria. If the user used a gesture on a pen-sensitive device to invoke the Start menu, a handwriting recognition input dialog may appear for the user to enter handwritten search criteria. A double-click on the Start button (or holding) if may result in different behavior than a single click. Again, these are only some of the many possible examples of variable Start menu's appearance/behavior, and some or all of these features may be user-configurable so that users may better meet their personal needs.

Figure 6:
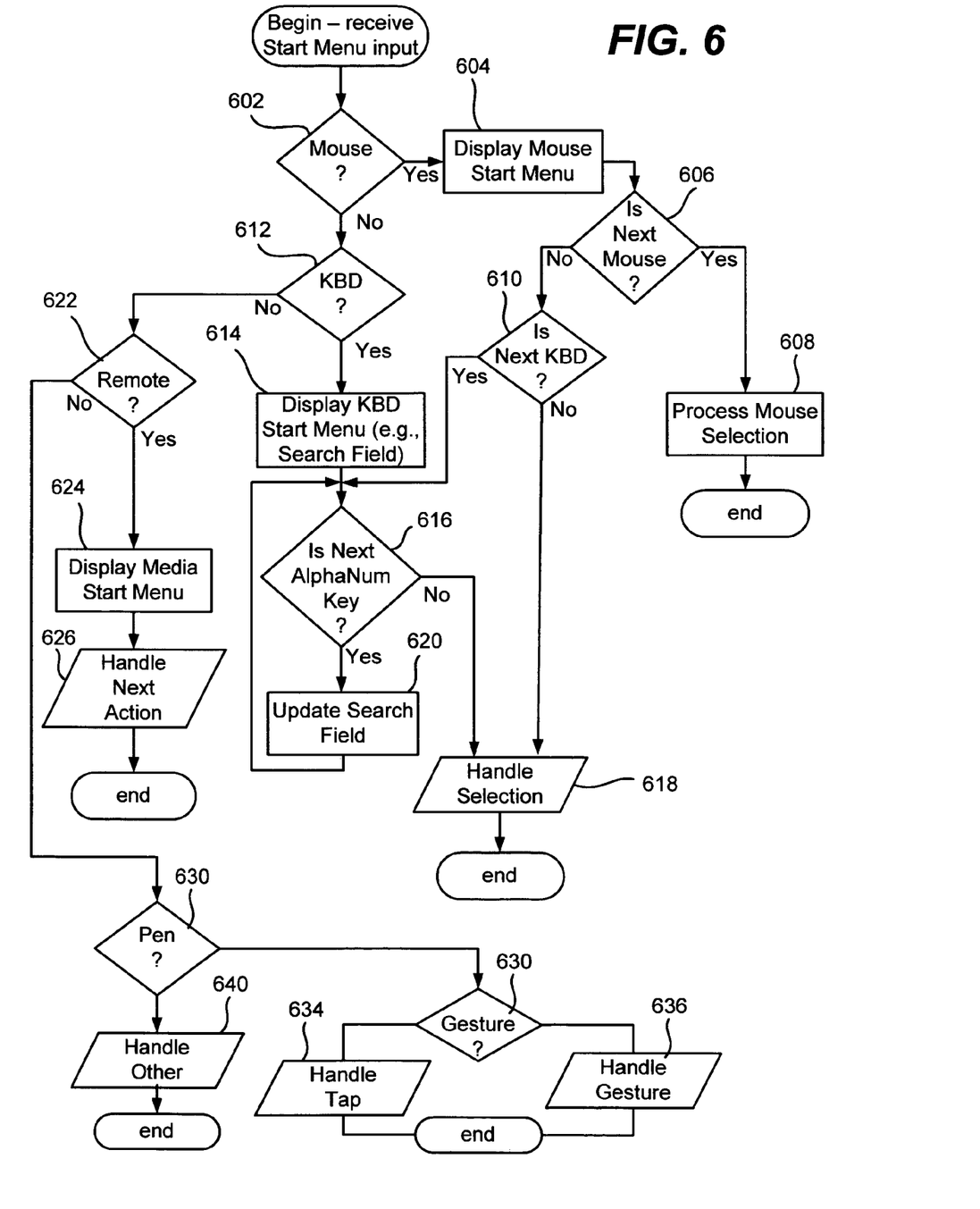
FIG. 6 is a flow diagram showing example logic that may be used to differentiate among input devices that invoke a Start menu to provide Start menu behavior that may correspond to each input device.

FIG. 6 is a flow diagram showing example handling logic, such as performed by the Start menu logic mechanism 240 (FIG. 2). Note that these steps need not appear in any particular order, except possibly if arranged for efficiency, and indeed may be event driven rather than actual decision steps. Moreover, more complex actions may be taken than those exemplified in the flow diagram, e.g., mouse hovering, double-clicks and the like are not shown as possible actuation methods, but are described above as alternative actuation methods that the system may recognize and act upon. Still further, as will be understood, virtually any set of configurations may be implemented, and thus while some of the actions in FIG. 6 are expanded into further detail, other of the actions are represented as being handled in a general case, for purposes of simplicity and brevity.

Step 602 represents a first test for the initial way in which the Start menu was actuated. If via mouse, step 602 branches to step 604 to display a "mouse" Start menu that may be unique to mouse actuation, depending on how a system is actually configured, (e.g., by default or user-override). The subsequent menu and operational behavior may depend on what the user does next. In this example, the user may enter a second mouse (click) event, as evaluated at step 606, in which event the mouse event is processed at step 608. Examples of processing the second mouse click include launching a selection (which may be to open the search field entry box), invoking a submenu, and essentially anything conventionally performed today via the Start menu.

If not a second mouse click at step 606, then it is possible the user has used the keyboard next, as evaluated at step 610. If so, then the process branches to step 616 to test whether the key was an alphanumeric key, e.g., as opposed to a cursor navigation key, an enter key, and so forth. If alphanumeric, the search filed is updated (note that it appears in the mouse Start menu, but if not, can be displayed at this time), and the process returns to step 616 to await another key or other type of action. If not an alphanumeric key, another action is taken at step 618, e.g., a search (providing at least one character is in the field) is launched, a selection of a highlighted item is made (e.g., for an enter key, a mouse or pointer click), another dialog or different Start menu is launched (e.g., following speech corresponding to a recognized command) and so forth.

Returning to step 602, if not a mouse-triggered Start menu, then the user may have invoked the Start menu via a dedicated Start keyboard key or combination, as evaluated at step 612. If so, step 612 branches to step 614 where a keyboard-invoked "Start" menu is displayed, such as including a search entry field and automatically providing a blinking cursor therein. Steps 616 and 618 or 620 are generally executed as described above, although it is feasible to have a different type of search for keyboard search startup versus mouse search startup, e.g., a local search versus an internet search.

Returning to step 612, if the start menu was invoked with something other than a mouse click or a keyboard, step 612 branches to step 622 to evaluate whether the user invoked the Start menu via a remote control device. If so, one example is to provide a "Media" Start menu at step 624, such as listing media devices, listing media titles, providing a search field for alphanumeric title searching, and so forth. Step 626 then represents handling a next action, which may be to navigate and/or select via remote control, keyboard, mouse or other device, receive search characters, cancel and invoke a different type of Start menu, and so forth.

If not remote control invoked at step 622, another possible test is represented at step 630 for determining whether the start menu was activated via pen. Note that this requires some type of pen-sensitive surface, e.g., a screen or digitizer, which if not present may be bypassed for a given system. In any event, if a pen, step 630 represents an evaluation as to whether the start menu was invoked via a tap (step 634) or a gesture, (if the system is configured for gestures, step 636. In general, a "pen" Start menu will be provided, which may be different for taps and gestures, and may be configured somewhat similar to a mouse Start menu, but instead provide more pen-based options (e.g., handwriting entry programs) for example.

Step 640 represents handling one or more other types of input mechanisms that may be used to invoke a Start menu. Examples include touch, speech, network events (e.g., operated from a remote location) and so forth. Again, each of the above steps are only examples, and a system may be configured in virtually any way to distinguish between input devices, actuation methods, initial and subsequent entry mechanisms and so forth to provide a corresponding a Start menu for each.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer-readable medium having computer-executable instructions, which when executed perform steps, comprising:
   distinguishing between a plurality of input mechanisms to determine which input mechanism was used to activate a start menu;
   selecting as a selected start menu a start menu corresponding to the input mechanism that was used, the functions available within the selected start menu being alterable based upon the input mechanism used;
   outputting the selected start menu;
   receiving data corresponding to interaction with the alterable functions available within the selected start menu; and
   taking action based on the further interaction.

2. The computer-readable medium of claim 1 wherein the input mechanism used to activate the start menu comprises a keyboard, and wherein the selected start menu provides an entry area for receiving further input from the keyboard.

3. The computer-readable medium of claim 1 wherein the input mechanism used to activate the start menu comprises a keyboard, and wherein receiving the data corresponding to interaction with the start menu comprises receiving further input from the keyboard.

4. The computer-readable medium of claim 3 wherein the further input from the keyboard comprises an alphanumeric key, and wherein taking action based on the further interaction comprises entering an alphanumeric character corresponding to the alphanumeric key into a search field.

5. The computer-readable medium of claim 1 wherein the input mechanism used to activate the start menu comprises a pointing device, wherein the selected start menu provides a set of choices from which one choice may be selected via further pointing device input, and wherein taking action comprises selecting a choice in response to further pointing device input.

6. The computer-readable medium of claim 1 wherein the input mechanism used to activate the start menu corresponds to a pen or touch sensitive digitizer, and wherein selecting as the selected start menu the start menu corresponding to the input mechanism that was used includes further computer-executable instructions for distinguishing between a gesture and another type of pen or touch input.

7. The computer-readable medium of claim 1 wherein the input mechanism used to activate the start menu comprises an input mechanism that provides a keystroke data, mouse data, speech data, pen data, touch data, remote control data or remote network data, and wherein receiving data corresponding to interaction with the start menu comprises receiving keystroke data, mouse data, audio data, pen data, touch data, remote control data or remote network data.

8. The computer-readable medium of claim 1 wherein taking action based on the further interaction comprises switching to a different start menu based on detection of a different input mechanism used to interact with the start menu with respect to the input mechanism that was used to activate the start menu.

9. The computer-readable medium of claim 1 wherein outputting the selected start menu comprises outputting a start menu facilitating entering search data, entering a run command, entering a command prompt, operating with a particular profile, and/or for playing media.

10. The computer-readable medium of claim 1 having further computer-executable instructions comprising varying the appearance of the selected start menu based on the input mechanism that was used.

11. At least one computer-readable medium having computer-executable instructions, which when executed perform steps, comprising:
   detecting activation of a start menu;
   determining how the start menu was activated from among a plurality of possible activation types;
   when the start menu was activated via a first activation type, presenting a first start menu/behavior usable for performing an operation from a first set of operations; and
   when the start menu was activated via a second activation type, presenting a second start menu/behavior usable for performing an operation from a second set of operations, the first and second sets of operations being unique sets of operations.

12. The computer-readable medium of claim 11 wherein detecting activation of a start menu comprises detecting that the start menu was activated via keyboard.

13. The computer-readable medium of claim 12 wherein the first start menu/behavior comprises providing a field for text entry.

14. The computer-readable medium of claim 11 wherein detecting activation of the start menu comprises detecting that the start menu was activated via a pointing device.

15. The computer-readable medium of claim 11 wherein detecting activation of the start menu comprises distinguishing between actuation methods on a single input device.

16. The computer-readable medium of claim 15 wherein distinguishing between actuation methods on the single input device comprises detecting an actuation of one of a plurality of dedicated keyboard keys.

17. The computer-readable medium of claim 15 wherein distinguishing between actuation methods on the single input device comprises detecting a double-actuation of the single input device.

18. In a computing environment having at least one computing device, a method comprising:
   providing a start menu;
   determining whether the start menu was invoked via a pointing device or via keyboard, wherein the pointing device enables invocation of the start menu via a first actuation method and a second actuation method, and the keyboard enables invocation of the start menu via a third actuation method and a fourth actuation method;
   when the start menu was invoked via the first actuation method of the pointing device, providing a first plurality of applications which can be activated via further interaction with the pointing device;
   when the start menu was invoked via the second actuation method of the pointing device, providing a second plurality of applications which can be activated via further interaction with the pointing device, wherein the first plurality of applications is different from the second plurality of applications;
   when the start menu was invoked via the third actuation method of the keyboard, providing a third plurality of applications which can be activated via interaction with the keyboard or the pointing device and a first search entry region by which a user may directly enter search criteria via further interaction with the keyboard; and
   when the start menu was invoked via the fourth actuation method of the keyboard, providing a fourth plurality of applications which can be activated via interaction with the keyboard or the pointing device and a second search entry region by which a user may directly enter search criteria via further interaction with the keyboard, wherein the first search entry region is adapted to provide search capabilities different from the second search entry region.

* * * * *